United States Patent
Nakanishi et al.

(10) Patent No.: US 12,463,214 B2
(45) Date of Patent: Nov. 4, 2025

(54) NEGATIVE ELECTRODE ACTIVE MATERIAL AND BATTERY

(71) Applicant: TOYOTA JIDOSHA KABUSHIKI KAISHA, Toyota (JP)

(72) Inventors: Haruyuki Nakanishi, Nagoya (JP); Haruo Sawa, Kochi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 371 days.

(21) Appl. No.: 17/530,016

(22) Filed: Nov. 18, 2021

(65) Prior Publication Data

US 2022/0181623 A1    Jun. 9, 2022

(30) Foreign Application Priority Data

Dec. 8, 2020    (JP) ................................. 2020-203394

(51) Int. Cl.
    *H01M 4/58*      (2010.01)
    *H01M 10/30*     (2006.01)
    *H01M 4/02*      (2006.01)

(52) U.S. Cl.
    CPC ............ *H01M 4/58* (2013.01); *H01M 10/30* (2013.01); *H01M 2004/027* (2013.01)

(58) Field of Classification Search
    CPC ............ H01M 4/58; H01M 4/52; H01M 4/48; H01M 4/521; H01M 4/136; H01M 10/30; H01M 2004/027
See application file for complete search history.

(56) References Cited

U.S. PATENT DOCUMENTS

| | | | |
|---|---|---|---|
| 2011/0136001 A1* | 6/2011 | Nakura | ................. H01M 4/485 252/182.1 |
| 2011/0183201 A1 | 7/2011 | Genin et al. | |
| 2013/0115514 A1* | 5/2013 | Nishijima | ............... C01B 25/45 252/519.1 |

FOREIGN PATENT DOCUMENTS

| | | |
|---|---|---|
| JP | 2011-529618 A | 12/2011 |
| JP | 2017-216126 A | 12/2017 |
| WO | 2017/208916 A1 | 12/2017 |
| WO | 2020/014446 A1 | 1/2020 |

* cited by examiner

*Primary Examiner* — Raymond Alejandro
(74) *Attorney, Agent, or Firm* — Dinsmore & Shohl LLP (57) ABSTRACT

Provided is a negative electrode active material for a battery, the negative electrode active material comprising an iron compound, the iron compound containing a salt of a polyoxygen anion with iron, wherein the polyoxygen anion has a first atom and an oxygen atom, the first atom is at least one type of atom selected from atoms belonging to Group 4, Group 5, Group 6, Group 13, and Group 14 in the periodic table of elements, and a molar ratio of the oxygen atom to the first atom in the polyoxygen anion is more than 1.

9 Claims, 3 Drawing Sheets

NEGATIVE ELECTRODE ACTIVE MATERIAL AND BATTERY

CROSS REFERENCE TO RELATED APPLICATIONS

This nonprovisional application claims priority to Japanese Patent Application No. 2020-203394 filed on Dec. 8, 2020, with the Japan Patent Office, the entire contents of which are hereby incorporated by reference.

BACKGROUND

Field

The present disclosure relates to a negative electrode active material and a battery.

Description of the Background Art

Lithium-ion batteries are a type of battery that has the highest storage energy density as of now. Lithium-ion batteries are used in portable devices, hybrid electric vehicles, electric vehicles, and the like. Lithium (a negative electrode active material) undergoes redox at a very low electric potential in a lithium-ion battery, and therefore a high battery voltage can be obtained. However, lithium is readily oxidized and produces high heat upon oxidization. Because lithium is also oxidized upon contact with water, an aqueous electrolyte solution is not suitable for use in a lithium-ion battery and instead an organic-solvent-based electrolyte solution needs to be used. However, a typical organic-solvent-based electrolyte solution is flammable.

Charging of a lithium electrode proceeds via a reaction in which solid precipitates out of solution, which tends to generate needle-like precipitates (called dendrites), and these dendrites can cause a short circuit. To inhibit the dendrite formation in a lithium-ion battery, reduced lithium is intercalated between carbon layers. However, this intercalation is accelerated during high-current charging, potentially causing dendrite precipitation on the carbon surface, and, therefore, it is necessary to avoid high-current charging for a lithium-ion battery. Charging needs to be performed very slowly particularly at the end stage of charging, which means that charging takes relatively long. For the above reasons, the entire system of lithium-ion battery is costly, including auxiliaries that are employed for carefully performing charge control, temperature detection, and the like, and, in addition, the production cost for environmental control during production is high. Moreover, it is relatively costly to discard and recycle the battery. Furthermore, lithium can be efficiently extracted only from limited locations, and therefore the resource is scarce and expensive.

Thus, there is a demand for a battery that is improved in terms of the above-described disadvantages of a lithium-ion battery and is also high in performance. Particularly for large batteries intended for electricity storage use (natural energy and surplus electricity, for example) and vehicle-mounted use, etc., not only high storage energy density but also reasonable cost, high safety, and easy disposal and recycling, etc. are demanded. At present, however, there is no battery that can sufficiently fulfill all these conditions.

As another typical secondary battery other than the lithium-ion battery, a nickel-metal hydride battery is considered, in which a hydrogen storage alloy is used in the negative electrode. In a nickel-metal hydride battery, a non-flammable aqueous electrolyte solution can be used, ensuring high safety. However, a nickel-metal hydride battery has a low battery voltage, and therefore its storage energy density is significantly low as compared to a lithium-ion battery. In addition, the rare earth element used in the hydrogen storage alloy in the negative electrode is expensive, scarce, and obtained only from a limited number of countries, and therefore not reliable in terms of stable supply of the raw material.

Instead of the nickel-metal hydride battery which uses a negative electrode based on hydrogen storage alloy, a nickel-iron battery using iron as a negative electrode active material can also be considered. Iron can be charged and discharged via reactions represented by the following reaction formula (1) and reaction formula (2), respectively:

$$[\text{Charging}]\ Fe(OH)_2 + 2e^- \rightarrow Fe + 2OH^- \quad (1)$$

$$[\text{Discharging}]\ Fe + 2OH^- \rightarrow Fe(OH)_2 + 2e^- \quad (2)$$

Iron is a resource that is less expensive and found throughout the world in abundance, without problems of raw material supply, making itself a very ideal substance as an electrode active material. In addition, an iron electrode has a redox potential relatively close to that of a hydrogen storage alloy electrode, and is suitable for use together with an aqueous electrolyte solution, which is an aqueous alkali solution as in the case of a nickel-metal hydride battery; therefore, it is safe.

Furthermore, one iron atom has two electrons transferable upon reaction represented by the above reaction formulae (1) and (2), that is, iron potentially has a large stoichiometric capacity, and therefore its low voltage can be compensated for by the large capacity. Although iron cannot be used as it is as an electrode material, it is known that iron oxide or iron hydroxide can be used as a material of an electrode (negative electrode). Both iron oxide and iron hydroxide are very poorly soluble in an aqueous alkali solution and do not dissolve in an electrolyte solution, rendering themselves highly stable in the battery.

As discussed above, in terms of price, safety, resource abundance, large potential capacity, and the like, an iron electrode is naturally an ideal electrode for a secondary battery (see Japanese Patent Laying-Open No. 2017-216126, for example). However, in reality, practical use of iron electrode is scarcely found at present because of the low activity toward charge-discharge reaction and the low active material utilization rate.

Because iron oxide (hydroxide) is poorly soluble in an aqueous alkali solution as discussed above, in order for the reaction represented by the above reaction formulae (1) and (2) to proceed at an iron electrode, it is necessary that large-sized oxide ions and hydroxide ions, etc., move within the solid iron oxide (or hydroxide). Iron oxide (or hydroxide) does not dissolve in an electrolyte solution and its structure is stable and dense, and therefore, a substance moves slowly within it, leading to a low electrode activity. Thus, reaction is less likely to permeate deep into the electrode in particular, which is a group of particles of iron oxide (or hydroxide), leading to a low utilization rate despite the large potential capacity.

To solve this problem of iron or iron compound becoming inert to charge-discharge reaction, or passivation, Japanese Patent Laying-Open No. 2017-216126 suggests use of a negative electrode active material containing a hybrid compound and iron, in which the hybrid compound consists of a metal such as zirconium and/or nickel bonded via a chemical bond to an organic polymer such as polyvinyl alcohol.

In addition, to solve the problem of inertness of an iron electrode, there are known methods for adding sulfide ions to a battery, such as adding iron sulfide to an electrode and adding potassium sulfide to alkali electrolyte solution.

SUMMARY

However, the iron electrode activation effect of the above methods is not sufficient for achieving practical use of an iron electrode (a negative electrode) for a battery.

An object of the present disclosure is to provide an iron-containing negative electrode active material having a decreased inertness to charge-discharge reaction, as well as a battery including the same.

[1] A negative electrode active material for a battery, the negative electrode active material comprising an iron compound, the iron compound containing a salt of a polyoxygen anion with iron, wherein the polyoxygen anion has a first atom and an oxygen atom, the first atom is at least one type of atom selected from atoms belonging to Group 4, Group 5, Group 6, Group 13, and Group 14 in the periodic table of elements, and a molar ratio of the oxygen atom to the first atom in the polyoxygen anion is more than 1.

[2] The negative electrode active material according to [1], wherein the polyoxygen anion is at least one selected from carbonate ion and aluminate ion.

[3] The negative electrode active material according to [1] or [2], wherein a molar percentage of the polyoxygen anion to the iron in the iron compound is 5 mol % or more.

[4] The negative electrode active material according to any one of [1] to [3], wherein the iron compound further contains nickel.

[5] The negative electrode active material according to any one of [1] to [4], wherein the iron compound further contains zinc.

[6] A battery comprising:
a positive electrode;
a negative electrode; and
an electrolyte solution, wherein
the negative electrode includes the negative electrode active material according to any one of [1] to [5].

[7] The battery according to [6], wherein the battery is at least one selected from a nickel-iron battery, a manganese-iron battery, and an iron-air battery.

The polyoxygen anion has many oxygens which are large in size, and, accordingly, the polyoxygen anion itself is also large in size. Therefore, the salt of a polyoxygen anion with iron, as compared to iron oxide or hydroxide, is low in density, loose in structure, and unstable. For this reason, the salt of a polyoxygen anion with iron tends to undergo structural change and tends to allow, for example, penetration of water molecules. Thus, as compared to iron oxide or hydroxide having a stable and dense structure, the salt of a polyoxygen anion with iron has a high activity to charge-discharge reaction.

Further, because it is loose in structure and unstable, the salt of a polyoxygen anion with iron can be slightly dissolved in an alkali electrolyte solution, unlike iron oxide or hydroxide. These loose, fine iron components, which can be dissolved in an electrolyte solution and move relatively freely, allow charge and discharge to occur therethrough. This leads to a significant enhancement of the activity to charge-discharge reaction, as compared to when oxide ions and hydroxide ions simply move within the stable, dense solid of iron oxide or hydroxide.

The foregoing and other objects, features, aspects and advantages of the present disclosure will become more apparent from the following detailed description of the present disclosure when taken in conjunction with the accompanying drawings.

DETAILED DESCRIPTION

Next, embodiments of the present disclosure will be described. It should be noted that the below description does not limit the scope of claims.

<Negative Electrode Active Material>

A negative electrode active material for a battery according to the present disclosure includes an iron compound that contains a salt of a polyoxygen anion with iron.

(Polyoxygen Anion)

The polyoxygen anion has a first atom and an oxygen atom, and the first atom is at least one type of atom selected from atoms belonging to Group 4, Group 5, Group 6, Group 13, and Group 14 in the periodic table of elements. The molar ratio of the oxygen atom to the first atom in the polyoxygen anion is more than 1.

The polyoxygen anion is large in size and therefore, when it binds to the iron ion, it can form a salt having a loose structure. In a battery including the negative electrode active material according to the present disclosure, the polyoxygen anion may bind to a cation to form a salt or may be dissolved in an electrolyte solution.

The polyoxygen anion is stable and less likely to undergo redox reaction within the operating voltage range of a battery which includes the negative electrode active material according to the present disclosure as a negative electrode material. The above-described polyoxygen anion, which has a first atom and an oxygen atom and the molar ratio of the oxygen atom to the first atom is more than 1, tends to be stable and less likely to undergo redox reaction within the operating voltage range of the battery.

Specific examples of the polyoxygen anion include borate ion, carbonate ion, aluminate ion, silicate ion, titanate ion, vanadate ion, molybdate ion, stannate ion, and tungstate ion.

The polyoxygen anion may include a first atom consisting of a plurality of types of atoms, and oxygen. The polyoxygen anion may include a plurality of first atoms of the same type, and may be an ion that corresponds to a condensate. Specific examples of the borate ion include borate ions corresponding to dehydration condensation products of boric acid, such as metaboric acid and polyboric acid. As the polyoxygen anion, one type of polyoxygen anion may be used alone, or a plurality of types of polyoxygen anions may be used in combination.

The salt of a polyoxygen anion with iron tends not to be dissolved in water or an alkali electrolyte solution, and is stable, easily handled, abundant as a resource, and less expensive. From these viewpoints, carbonate ion, aluminate ion, and the like are used as the polyoxygen ion.

The salt of a polyoxygen anion with iron refers to a salt in a broad sense, including a hydrate containing a water molecule. The iron compound may include a salt of a hydroxide ion with iron and a salt of a polyoxygen anion with a cation other than iron, in addition to the salt of a polyoxygen anion with iron, as long as the effect of the present disclosure effect is obtained.

The molar percentage of the polyoxygen anion to the iron in the iron compound is 5 mol % or more, or 20 mol % or more.

When the salt of a polyoxygen anion (such as a carbonate ion, for example) with iron is included in the negative electrode, it is possible to perform charge and discharge at an electric potential relatively close to that of the reactions represented by the above formulae (1) and (2), as shown by the below reaction formulae (3) and (4).

[Charging]  $FeCO_3 + 2e^- \rightarrow Fe + CO_3^{2-}$ (3)

[Discharging]  $Fe + CO_3^{2-} \rightarrow FeCO_3 + 2e^-$ (4)

In some embodiments, the negative electrode active material and a battery (described below) according to the present disclosure do not include any component, such as a sulfide, that can present a problem of toxicity at the time of raw material management and disposal. Sulfides such as iron sulfide and potassium sulfide can ignite spontaneously and are not easy to handle, leading to a high production cost. In addition, these sulfides can react with water to generate toxic hydrogen sulfide, and therefore a sulfide-containing battery can present a problem at the time of disposal. Further, sulfide ions dissolved in an electrolyte solution can be oxidized at a positive electrode, presenting a problem that the effect thereof may not last long.

Conventionally, there is a problem that an iron electrode can generate hydrogen gas during charging to decrease the charge efficiency, but the negative electrode active material according to the present disclosure can solve this problem with an increased activity of iron reduction reaction. More specifically, hydrogen-generating reaction and iron reduction reaction are competitive to each other, and therefore when the activity of the iron reduction reaction is increased, hydrogen gas generation is relatively decreased. It should be noted that the equilibrium potential of an equilibrium reaction such as those represented by the above reaction formulae (1) and (2) is slightly lower than the redox potential of hydrogen, and therefore hydrogen tends to be generated during charging. Conventionally, the activity of reduction reaction of iron oxide or hydroxide is low, and the resulting metal iron has a low hydrogen overvoltage, and therefore hydrogen tends to be generated at the surface.

When the salt of a polyoxygen anion with iron comes into contact with an alkali electrolyte solution or when charge and discharge are carried out in an alkali electrolyte solution, the salt can become a stable oxide or hydroxide. However, because the oxide or hydroxide is very poorly soluble, the original loose structure is retained. With a sufficient amount of the polyoxygen anion being present in the battery, at the time when metal iron reduced by charging is subsequently oxidized by discharging, it can bind to the polyoxygen anions again. Accordingly, the activity-enhancing effect attributed to the loose structure and dissolution is maintained.

However, the salt of a polyoxygen anion with iron can become a stable oxide or hydroxide in an alkali electrolyte solution during repeated charge and discharge, and further, the resulting crystals can grow to undergo passivation. In this case, crystal growth tends to occur if the compound is solely composed of iron, but when other elements are also present, they can inhibit crystal growth. Nickel exhibits this effect, and therefore the negative electrode active material may further contain nickel.

Nickel is particularly effective when it coexists in the iron compound in the form of a carbonate, a basic carbonate, a hydroxide, an oxide, or a hydrate of these. Moreover, nickel can be reduced to metal nickel at a negative electrode potential, and it can be also effective when it coexists in the iron compound in the metal state. The metal nickel and the nickel compound are poorly soluble in an alkali electrolyte solution and stable, and therefore very effective in preventing iron passivation.

The iron compound forms solid solution with nickel ions. As for nickel, when introduced as nickel ions into and forming solid solution with the iron compound, nickel is mixed with the iron compound even more thoroughly, becoming even more effective in preventing passivation. Typically, iron oxide, iron hydroxide, or a salt of a polyoxygen anion with iron, for example, is prepared by neutralizing an aqueous solution of a suitable iron salt with an aqueous alkali solution, an aqueous polyoxygen anion solution, or the like. At this time, with a suitable nickel salt dissolved and coexist in the iron salt solution, solid solution of nickel with the iron compound can be formed.

As for the carbonate, some carbonate ions become carbon dioxide gas during synthesis and thereby the carbonate tends to become a porous body with a large specific surface area. Therefore, a negative electrode active material including iron carbonate has a higher activity to charge-discharge reaction. At surfaces of negative electrode active material particles, iron redox reaction proceeds smoothly because it requires less movement of substances within solid, and when the specific surface area is large, it means that the proportion of these highly-reactive surface portions is large.

In some embodiments, the negative electrode active material contains zinc, and in some embodiments the iron compound forms solid solution with zinc ions.

By making the iron compound (as a constituent of the negative electrode active material) contain an element other than iron, it is possible to adjust the discharge voltage of the battery to some extent. For example, when the iron compound contains zinc, the discharge voltage of the battery can be increased and the storage energy of the battery can be enhanced. As for zinc, when introduced as zinc ions into and forming solid solution with the iron compound, zinc is even more effective in enhancing voltage. Typically, iron oxide, iron hydroxide, or a salt of a polyoxygen anion with iron, for example, is prepared by neutralizing an aqueous solution of a suitable iron salt with an aqueous alkali solution, an aqueous polyoxygen anion solution, or the like. At this time, with a suitable zinc salt dissolved in the iron salt solution, solid solution of zinc ions with the iron compound can be formed.

In addition to the iron compound, the negative electrode active material may include an additive such as a conductive agent.

The iron compound included in the negative electrode active material is an electric insulator, except when it is in a reduced, metal state. Because charge-discharge reaction requires electron transfer, when the negative electrode active material further includes a conductive agent, the reaction activity can be enhanced.

Examples of the conductive agent include nickel, copper, cobalt, bismuth, and graphite. These nickel, copper, cobalt, bismuth, and the like need to be in the metal state to function as a conductive agent. Graphite may be any graphite as long as it is electrically conductive, and it may be, for example, carbon nanotubes, graphene, and the like. These conductive agents function not only to improve electric conductivity but also to stabilize metal iron produced by reduction during charging.

The conductive agent can be simply mixed with iron compound particles, but also, more ideally, it can be added while the iron compound is being synthesized, for even more thorough contact with them. More specifically, it is typical that iron oxide, iron hydroxide, or a salt of iron with a polyoxygen anion and/or the like is prepared by neutralizing an aqueous solution of a suitable iron salt with an aqueous alkali solution, an aqueous polyoxygen anion solution, or the like, and, at this time, with the conductive agent dissolved in the iron salt solution, the iron compound can be brought into even more thorough contact with the conductive agent. It is not necessary to add the nickel, copper, cobalt, bismuth, and the like in the metal state; they may be added in the state of compound such as salt, oxide, and/or hydroxide and reduced into the metal state during charging after the battery is assembled.

The negative electrode active material according to the present disclosure can be formed into an electrode by a commonly-employed method. For example, an electrode (a negative electrode) may be fabricated by applying a paste containing iron compound powder, the conductive agent, and a binder (SBR latex, polyvinylidene difluoride, and/or the like) to a metal substrate such as a metal foil and/or a perforated metal sheet or by filling the paste into a metal porous body.

The present disclosure is characterized by the action of the iron compound used as a negative electrode active material, and there is no particular limitation on the positive electrode, the separator, and the like to be combined with the negative electrode.

The negative electrode active material according to the present disclosure is applicable to a nickel-iron battery in which nickel hydroxide is used as a positive electrode active material, a manganese-iron battery in which manganese oxide is used as a positive electrode active material, an iron-air battery in which atmospheric oxygen is used as a positive electrode active material, and the like.

<Battery>

The battery according to the present disclosure can be used for, for example, batteries for portable devices, batteries for vehicle-mounted use, and batteries for electricity storage. The battery may be either a primary battery or a secondary battery. In the following, an example of the configuration of a nickel-iron battery (Ni—Fe) is described, referring to drawings.

Figure 5:
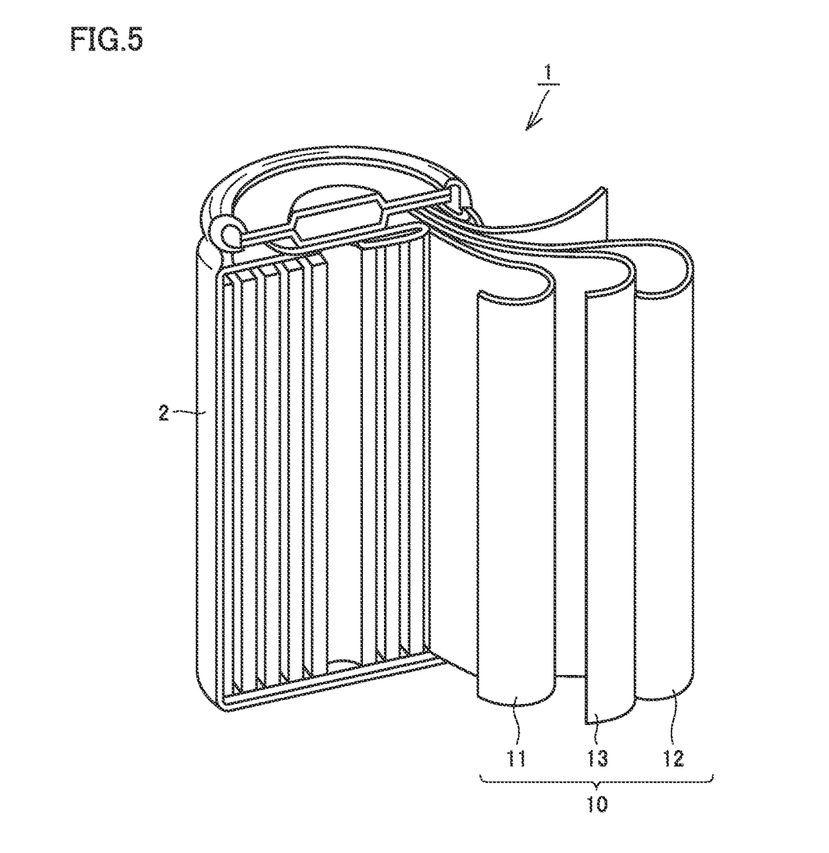
FIG. 5 is a schematic view illustrating an example configuration of a nickel-iron battery.

FIG. 5 is a schematic view illustrating an example configuration of a nickel-iron battery.

A battery 1 is a nickel-iron battery. Battery 1 includes a case 2. Case 2 is a cylindrical casing. Case 2 is made of metal. However, case 2 may have any configuration. For example, case 2 may be a prismatic casing. For example, case 2 may be a pouch made of an aluminum-laminated film. For example, case 2 may be made of resin.

Case 2 accommodates a power storage element 10 and an electrolyte solution. Power storage element 10 includes a positive electrode 11, a negative electrode 12, and a separator 13. Power storage element 10 as illustrated in the figure is a wound-type one. Power storage element 10 is formed by spirally winding belt-shaped electrodes. Power storage element 10 may be a stack-type, for example. Power storage element 10 may be formed by, for example, stacking sheet-shaped electrodes.

<<Negative Electrode>>

Negative electrode 12 is in sheet form. Negative electrode 12 may have a thickness from 10 μm to 1 mm, for example. Negative electrode 12 has an electric potential that is lower than that of positive electrode 11. Negative electrode 12 includes the above-described negative electrode active material according to the present disclosure. Negative electrode 12 may consist essentially of the negative electrode active material.

Negative electrode 12 may further include a current collector, a binder, and the like, in addition to the negative electrode active material. The current collector may include a perforated metal, a metal foil, and/or a porous metal sheet, for example. The current collector may be made of Ni, for example.

For example, the negative electrode active material and the binder may be applied to the current collector to form negative electrode 12. The binder binds the current collector and the negative electrode active material to each other. The binder may include an optional component. The binder may include, for example, at least one selected from the group consisting of styrene-butadiene rubber (SBR), carboxymethylcellulose (CMC), polytetrafluoroethylene (PTFE), and acrylic resin. The content of the binder may be, for example, from 0.1 parts by mass to 10 parts by mass relative to 100 parts by mass of the negative electrode active material.

<<Positive Electrode>>

Positive electrode 11 is in sheet form. Positive electrode 11 may have a thickness from 10 μm to 1 mm, for example. Positive electrode 11 has an electric potential that is higher than that of negative electrode 12. Positive electrode 11 includes a positive electrode active material. The positive electrode active material may include an optional component. Examples of the positive electrode active material include nickel hydroxide, manganese dioxide, and silver oxide.

Positive electrode 11 may consist essentially of the positive electrode active material. Positive electrode 11 may further include, for example, a current collector, a conductive material, and a binder, in addition to the positive electrode active material. The current collector may include a porous metal sheet, for example. The current collector is made of Ni, for example.

For example, the positive electrode active material, the conductive material, and the binder are applied to the current collector to form positive electrode 11. The conductive material is electronically conductive. The conductive material may include an optional component. The conductive material may include carbon black, Co, and/or cobalt oxide, for example. The content of the conductive material may be, for example, from 0.1 to 10 parts by mass relative to 100 parts by mass of the positive electrode active material. The binder binds the current collector and the positive electrode active material to each other. The binder may include an optional component. The binder may include ethylene vinyl acetate (EVA), for example. The content of the binder may be, for example, from 0.1 to 10 parts by mass relative to 100 parts by mass of the positive electrode active material.

<<Separator>>

Separator 13 is in sheet form. Separator 13 is interposed between positive electrode 11 and negative electrode 12. Separator 13 physically separates positive electrode 11 from negative electrode 12. Separator 13 may have a thickness from 50 to 500 µm, for example. Separator 13 is porous. Separator 13 may include a stretched porous film and/or a nonwoven fabric, for example. Separator 13 is electrically insulating. The separator may be made of polyolefin and/or polyamide, for example.

<<Electrolyte Solution>>

The electrolyte solution is not particularly limited, and in some embodiments the electrolyte solution is a highly-safe aqueous electrolyte solution. As the aqueous electrolyte solution, an aqueous alkali solution and/or the like can be used, for example. The aqueous alkali solution includes water and an alkali metal hydroxide dissolved in water, for example. The alkali metal hydroxide may have a concentration from 1 to 20 mol/L, for example. Examples of the alkali metal hydroxide include potassium hydroxide (KOH), sodium hydroxide (NaOH), and lithium hydroxide (LiOH).

The electrolyte solution may include the above-described salt of a polyoxygen anion. The salt of a polyoxygen anion to be added to the electrolyte solution is highly soluble and highly dissociative, and examples thereof include potassium salt and sodium salt. In some embodiments, this salt is not an iron salt.

To obtain the effect according to the present disclosure, it is desirable to use "the salt of a polyoxygen anion with iron" that is loose in structure, as the negative electrode active material at the time of assembling the battery. However, as long as the polyoxygen anion is present in the battery, a salt of a polyoxygen anion with iron can be formed when reduced metal iron is oxidized by discharging, and thereby the activity-enhancing effect of the negative electrode active material can be displayed. Therefore, the iron compound included in the negative electrode active material is not necessarily required to contain a salt of a polyoxygen anion with iron at the time of assembling the battery.

That is, the scope of the battery according to the present disclosure also encompasses an aspect in which the above-described polyoxygen anion is dissolved in advance in the alkali electrolyte solution (which is to be introduced into the battery) and then when the battery is discharged, the negative electrode active material becomes to include an iron compound containing a salt of a polyoxygen ion and iron.

Even when a salt of a polyoxygen anion is included not in the negative electrode but in another constituent of the battery, if the polyoxygen anion is dissociated in the electrolyte solution and forms a salt with iron that is present in the negative electrode active material, the effect according to the present disclosure is also obtained. This aspect is also encompassed within the scope of the battery according to the present disclosure. In this case, the salt of a polyoxygen anion may be, for example, a layered compound (such as hydrotalcite) having a complex structure in which the polyoxygen anion is interposed between two layers consisting of metal oxide or hydroxide.

The polyoxygen anion present in the battery is not necessarily bound to all iron (iron ions) in the negative electrode active material, but it may be bound to at least some of the iron ions, to obtain the effect according to the present disclosure. Therefore, the number of polyoxygen anions present in the battery may be fewer than the number of the iron ions contained in the negative electrode active material. However, when the number of polyoxygen anions is too small relative to the number of iron ions, sufficient effect may not necessarily be obtained. For this reason, the ratio of the total amount of polyoxygen anions in the battery to the total amount of iron atoms in both the metal state and the ion state present in the negative electrode active material is 5 mol % or more, or 20 mol % or more.

EXAMPLES

Next, examples according to the present disclosure will be described. It should be noted that the below description does not limit the scope of claims.

Example 1

The present example is an example of a nickel-iron battery in which iron carbonate is used as a negative electrode active material.

The iron carbonate was prepared by adding an aqueous potassium carbonate solution (concentration, 3 mol/L) to a stirred aqueous solution of iron (II) sulfate heptahydrate (Kishida Chemical) (concentration, 1 mol/L), followed by filtering, warm water rinsing, and drying. The amounts of both aqueous solutions were adjusted so that the number of iron ions in iron sulfate was the same as the number of carbonate ions in potassium carbonate.

The resulting iron carbonate was ground in a mortar, and the ground product was used as a negative electrode active material to fabricate an electrode (a negative electrode). More specifically, ground iron carbonate (90 mass %) and carbon black powder (Kishida Chemical) (10 mass %) were mixed, and to the resulting powder mixture, carboxymethylcellulose sodium salt (CMC Na salt) (Kishida Chemical) (1.5 mass %) was added to prepare a paste. The mixing ratio of the powder mixture and the CMC Na salt aqueous solution was 4:6 in mass ratio. The paste was applied to one side of a die-cut porous copper disk (diameter, 20 mm) (Nagamine Manufacturing, MF-80A), which was then dried and pressed with a pressure of 27 MPa to fabricate an electrode (a negative electrode). The amount of the negative electrode active material in the negative electrode was 0.1 g.

The negative electrode thus fabricated was placed, together with a sulfonated polypropylene nonwoven fabric for use in an ordinary nickel-metal hydride battery (circular, with a diameter of 23 mm) as well as a nickel hydroxide electrode for use in an ordinary nickel-metal hydride battery (a nickel porous body filled with nickel hydroxide, disk-like, with a diameter of 20 mm), in a commercially available battery casing (Takumi Giken, flat cell (equipped with a pressure sensor)). Into the battery, 0.2 mL of an alkali electrolyte solution (KOH 27 wt %, NaOH 3 wt %, 1 wt %) was injected. The positive electrode capacity was about 70 mAh; the positive electrode capacity was set to be excessive relative to the negative electrode capacity. In a battery for use in practical settings, the positive electrode capacity is set to be less than the negative electrode capacity and the positive electrode capacity is predominant; but in the present example which places importance on the performance of the negative electrode, the positive electrode capacity was set to be excessive relative to the negative electrode capacity and the negative electrode capacity was set to be predominant. The battery was subjected to constant-current charge and discharge in a thermostatic chamber at 25° C. at a current of 6 mA. The discharge cut-off voltage was 0.9 V.

Example 2

The present example shows an example nickel-iron battery in which an iron aluminate salt is used as a negative electrode active material. The iron aluminate salt was prepared by adding an aqueous sodium aluminate ($NaAlO_2$) solution (concentration, 0.67 mol/L) to a stirred aqueous solution of iron (II) sulfate heptahydrate (Kishida Chemical) (concentration, 1 mol/L), followed by filtering, warm water rinsing, and drying. The number of aluminate ions in sodium aluminate was twice the number of iron ions in iron sulfate. Except this, in the same manner as in Example 1, a negative electrode and a battery were fabricated and a battery test was conducted.

Example 3

As an example of the battery according to the present disclosure, an example is shown in which the iron compound in the negative electrode contains nickel. To an aqueous solution of iron (II) sulfate heptahydrate (Kishida Chemical) (concentration, 1 mol/L), nickel (II) sulfate hexahydrate (Kishida Chemical) was dissolved in advance in such an amount to achieve a ratio between the number of moles of iron ions and the number of moles of nickel of 7:3, and thereto, an aqueous potassium carbonate solution (concentration, 3 mol/L) was added, followed by filtering, warm water rinsing, and drying. The total number of iron ions in iron sulfate and nickel ions in nickel sulfate was the same as the number of carbonate ions in potassium carbonate. Except this, in the same manner as in Example 1, a negative electrode and a battery were fabricated and a battery test was conducted.

Example 4

As an example of the battery according to the present disclosure, an example is shown in which the iron compound in the negative electrode contains zinc. To an aqueous solution of iron (II) sulfate heptahydrate (Kishida Chemical) (concentration, 1 mol/L), zinc sulfate heptahydrate (Kishida Chemical) was dissolved in advance in such an amount to achieve a ratio between the number of moles of iron ions and the number of moles of zinc ions of 7:3, and thereto, an aqueous potassium carbonate solution (concentration, 3 mol/L) was added, followed by filtering, warm water rinsing, and drying. The total number of iron ions in iron sulfate and zinc ions in zinc sulfate was the same as the number of carbonate ions in potassium carbonate. Except this, in the same manner as in Example 1, a negative electrode and a battery were fabricated and a battery test was conducted.

Comparative Example 1

As Comparative Example 1, an example nickel-iron battery is shown in which no polyoxygen anion is introduced into the battery. To an aqueous solution of iron (II) sulfate heptahydrate (Kishida Chemical) (concentration, 1 mol/L) being stirred, an aqueous sodium hydroxide solution (concentration, 3 mol/L) was added, followed by filtering, warm water rinsing, and drying. The number of sodium hydroxide was twice the number of iron ions in iron sulfate. Except this, in the same manner as in Example 1, a negative electrode and a battery were fabricated and a battery test was conducted.

Figure 1:
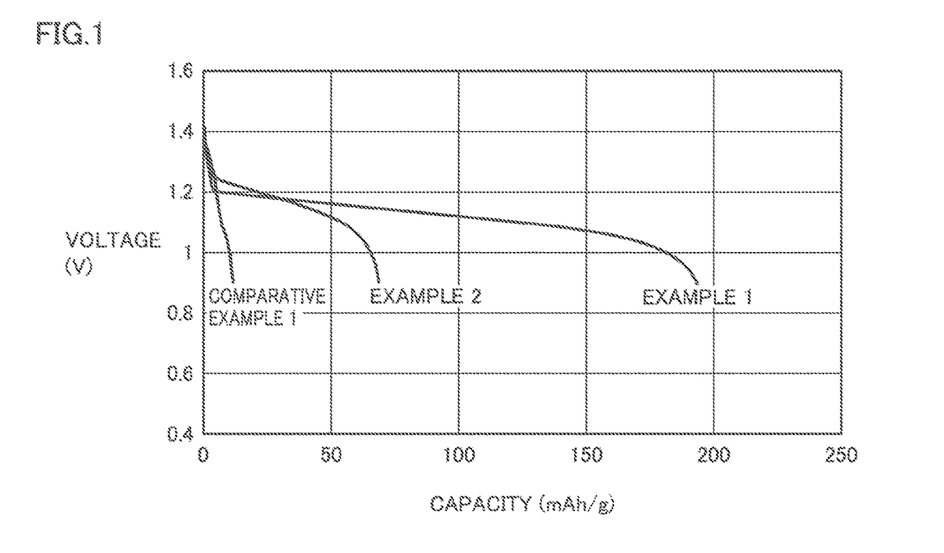
FIG. 1 shows discharge voltage curves for nickel-iron batteries of Examples 1 and 2 and Comparative Example 1.

FIG. 1 shows results of discharge voltage curves in the battery tests in Examples 1 and 2 and Comparative Example 1. The capacity on the horizontal axis in FIG. 1 is a value of battery capacity converted into capacity per 1 g of iron compound, which is a negative electrode active material (the same is true for FIG. 2 to FIG. 4).

Referring to the results shown in FIG. 1, it is found that, in contrast to the battery which included an ordinary, polyoxygen-anion-free iron oxide (hydroxide) as a negative electrode active material and was very inert to charge-discharge reaction, the battery according to the present disclosure which included a salt of a polyoxygen anion with iron had an significantly enhanced discharged capacity.

Figure 2:
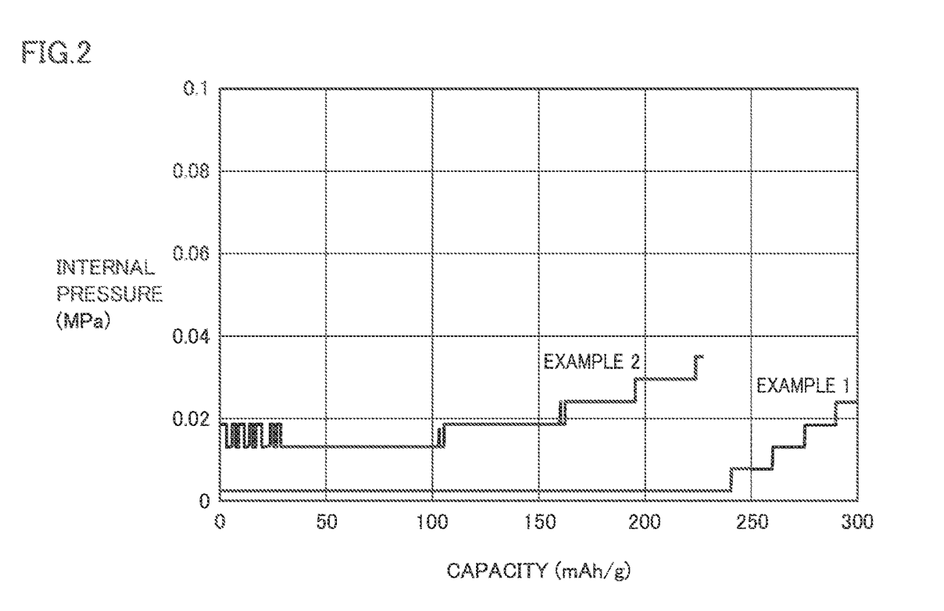
FIG. 2 shows internal pressure of nickel-iron batteries of Examples 1 and 2 during charging.

FIG. 2 shows internal pressure (gas pressure) of batteries of Examples 1 and 2 during charging. It is found that the battery according to the present disclosure which included a salt of a polyoxygen anion with iron did not generate hydrogen gas until fully charged, indicating that it was charged to as high as near 100%.

Figure 3A:
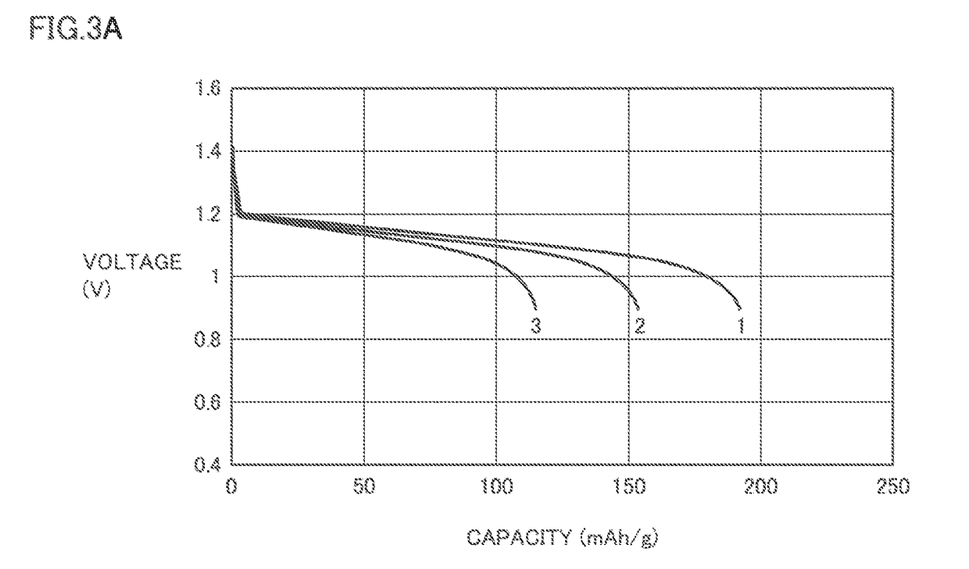
FIG. 3A shows changes in a discharge voltage curve for a nickel-iron battery of Example 1 as charge-discharge cycles proceed.
Figure 3B:
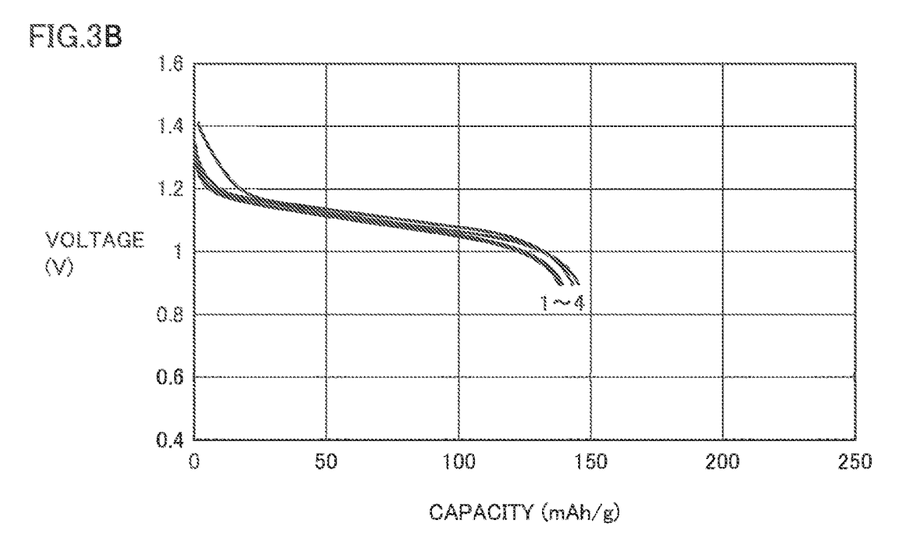
FIG. 3B shows changes in a discharge voltage curve for a nickel-iron battery of Example 3 as charge-discharge cycles proceed.

However, as shown in FIG. 3A, the battery according to the present disclosure which included only a salt of a polyoxygen anion with iron showed a phenomenon of passivation where the capacity decreased as the charge-discharge cycles proceeded. In contrast to this, as shown in FIG. 3B, it is found that, when the negative electrode active material according to the present disclosure contained nickel, the capacity tended not to decrease as the charge-discharge cycles were repeated. The numerals in FIGS. 3A and 3B represent the number of cycles.

Figure 4:
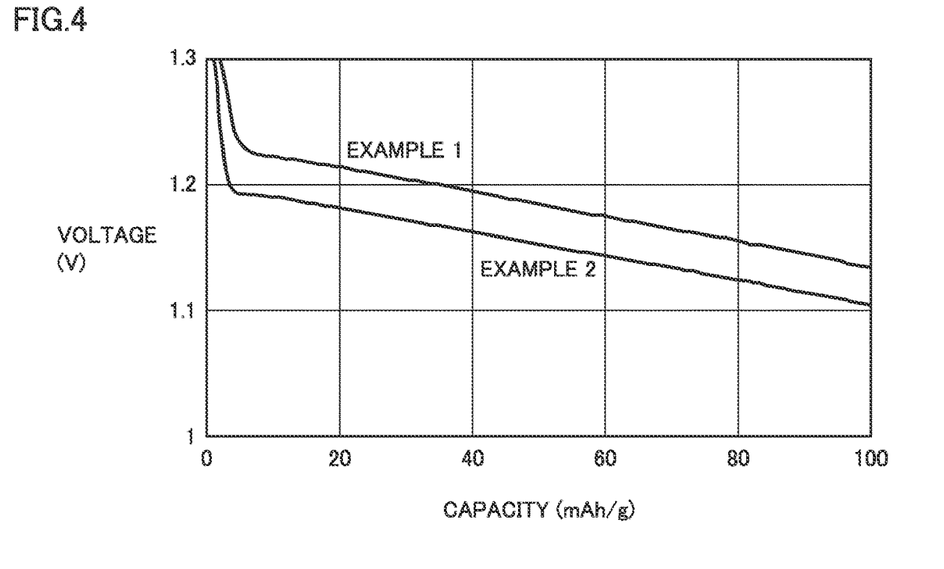
FIG. 4 shows discharge voltage curves for nickel-iron batteries of Examples 1 and 4.

As shown in FIG. 4, it is found that, when the negative electrode active material according to the present disclosure contained zinc, the discharge voltage was higher than that of a battery which included only a salt of a polyoxygen anion with iron.

The embodiments and examples disclosed herein are illustrative and non-restrictive in any respect. The technical scope defined by the terms of the claims also encompasses any modifications within the meaning equivalent to the terms of the claims. The technical scope defined by the terms of the claims also encompasses any modifications within the scope equivalent to the terms of the claims.

Although the embodiments of the present disclosure have been described, the embodiments disclosed herein are illustrative and non-restrictive in any respect. The scope of the present disclosure is defined by the terms of the claims, and is intended to encompass any modifications within the meaning and scope equivalent to the terms of the claims

What is claimed is:

1. A negative electrode active material incorporated into a battery, the negative electrode active material comprising:
   an iron compound, the iron compound containing a salt of a polyoxygen anion with iron, wherein
   the polyoxygen anion has a first atom and an oxygen atom, the first atom is at least one type of atom selected from atoms belonging to Group 4, Group 5, Group 6, Group 13, and Group 14 in the periodic table of elements, and
   a molar ratio of the oxygen atom to the first atom in the polyoxygen anion is more than 1,
   the polyoxygen anion is a carbonate ion,
   the negative electrode active material is configured to charge by the reaction expressed in Formula (1), and
   the negative electrode active material is configured to discharge by the reaction expressed in Formula (2), $FeCO_3 + 2e^- \rightarrow Fe + CO_3^{2-}$  (Formula 1)

$Fe + CO_3^{2-} \rightarrow FeCO_3 + 2e^-$  (Formula 2).

2. The negative electrode active material according to claim 1, wherein a molar percentage of the polyoxygen anion to the iron in the iron compound is 5 mol % or more.

3. The negative electrode active material according to claim 1, wherein the iron compound further contains nickel.

4. The negative electrode active material according to claim 1, wherein the iron compound further contains zinc.

5. The negative electrode active material according to claim 1, further comprising a conductive agent.

6. The negative electrode active material according to claim 5, wherein the conductive agent comprises one or more of nickel, copper, cobalt, bismuth, and graphite.

7. The negative electrode active material according to claim 1, wherein the iron compound further comprises a salt of a hydroxide ion with iron, and a salt of the polyoxygen anion with a cation other than iron.

8. A battery comprising:
a positive electrode;
a negative electrode; and
an electrolyte solution, wherein the negative electrode includes the negative electrode active material according to claim 1.

9. The battery according to claim 8, wherein the battery is at least one selected from a nickel-iron battery, a manganese-iron battery, and an iron-air battery.

* * * * *